United States Patent
Konecny

(10) Patent No.: US 10,110,447 B2
(45) Date of Patent: Oct. 23, 2018

(54) ENHANCED REST SERVICES WITH CUSTOM DATA

(71) Applicant: Oracle International Corporation, Redwood Shores, CA (US)

(72) Inventor: David Konecny, Motueka (NZ)

(73) Assignee: Oracle International Corporation, Redwood Shores, CA (US)

( * ) Notice: Subject to any disclaimer, the term of this patent is extended or adjusted under 35 U.S.C. 154(b) by 203 days.

(21) Appl. No.: 15/154,146

(22) Filed: May 13, 2016

(65) Prior Publication Data

US 2017/0118095 A1    Apr. 27, 2017

Related U.S. Application Data

(60) Provisional application No. 62/245,680, filed on Oct. 23, 2015.

(51) Int. Cl.
| | | |
|---|---|---|
| *G06F 15/173* | (2006.01) | |
| *H04L 12/24* | (2006.01) | |
| *H04L 29/06* | (2006.01) | |
| *H04L 29/08* | (2006.01) | |

(52) U.S. Cl.
CPC .......... *H04L 41/5054* (2013.01); *H04L 67/02* (2013.01); *H04L 67/04* (2013.01); *H04L 67/10* (2013.01); *H04L 67/42* (2013.01)

(58) Field of Classification Search
CPC ... H04L 43/065; H04L 43/12; H04L 41/5054; H04L 67/02; H04L 67/04; H04L 67/10; H04L 67/42
See application file for complete search history.

(56) References Cited

U.S. PATENT DOCUMENTS

| | | | | |
|---|---|---|---|---|
| 8,572,157 | B2* | 10/2013 | Bouw | G06F 17/30569 707/741 |
| 9,026,608 | B1* | 5/2015 | Goldband | G06F 8/35 709/203 |
| 9,329,881 | B2* | 5/2016 | O'Donnell | G06F 9/45533 |
| 9,600,547 | B2* | 3/2017 | Holmes | G06F 17/30563 |
| 9,811,394 | B1* | 11/2017 | Kogias | G06F 9/541 |
| 2012/0131326 | A1* | 5/2012 | Lau | H04L 63/104 713/150 |
| 2013/0085993 | A1* | 4/2013 | Li | G06F 17/30575 707/636 |
| 2014/0280494 | A1* | 9/2014 | Samoylenko | H04L 67/10 709/203 |
| 2015/0271271 | A1* | 9/2015 | Bullotta | H04L 67/141 709/228 |

* cited by examiner

*Primary Examiner* — June Y Sison
*Assistant Examiner* — Dixon F Dabipi
(74) *Attorney, Agent, or Firm* — Kilpatrick Townsend & Stockton LLP

(57) ABSTRACT

The present disclosure relates generally to REpresentational State Transfer (REST) services, and more particularly, to techniques for enhancing REST services with custom data. One of the techniques includes receiving a request from an end user for a service provided by a REST end point, implementing a data retrieval from the REST end point on behalf of the end user to obtain one or more representations of resources for the requested service, extracting a primary key from the one or more representations of resources, using the primary key to obtain custom data for the requested service, and merging the custom data with the one or more representations of resources to create a response to the request from the end user for the service.

12 Claims, 9 Drawing Sheets

ENHANCED REST SERVICES WITH CUSTOM DATA

CROSS-REFERENCE TO RELATED APPLICATION

The present application claims priority and benefit from U.S. Provisional Application No. 62/245,680, filed Oct. 23, 2015, entitled "ENHANCED REST SERVICES WITH CUSTOM DATA," the entire content of which is incorporated herein by reference for all purposes.

BACKGROUND

The present disclosure relates generally to REST services, and more particularly, to techniques (e.g., systems, methods, computer program products storing code or instructions executable by one or more processors) for enhancing REST services with custom data.

REpresentational State Transfer (REST) is a key design idiom that embraces a stateless client-server architecture in which web services are viewed as resources (e.g., pictures, video files, Web pages, business information, or anything that can be represented in a computer-based system) and can be identified by their uniform resource identifiers (URIs). A web service based on REST is called a REST or RESTful service. The focus of a REST service is on the resources and how to provide access to these resources. For example, web service clients that want to use these resources access a particular representation by transferring application content using a small globally defined set of remote methods that describe the action to be performed on the resource (e.g., create, read, update, and delete (CRUD)). REST is an analytical description of the existing web architecture, and thus the interplay between the style and the underlying hypertext transfer protocol (HTTP) appears seamless.

A primary constraint of a REST service is that the resources are controlled by the base application system. Nonetheless, it is often the case that applications of web service clients such as small scale departmental applications often need to access existing base application systems via REST services and enhance the controlled data resources with custom data such as additional application/department specific data. The common industry solution is to make the base application system customizable or extensible. Each base application system therefore has to be customized or extended to provide the custom data that may or may not be web service client specific. This has several problems including: (i) limited scalability and modifiability, (ii) metadata about the customized resources may be limited or missing, which may make controlling caching, detecting transmission errors, negotiating an appropriate representation format, and/or performing authentication or access control difficult, and (iii) added security measures for the custom data.

Therefore, a method for enhancing REST services with custom data is desired.

BRIEF SUMMARY

Systems, methods and computer-readable memory for enhancing REST services with custom data are described.

In exemplary embodiments, a method is performed by a computing system, and the method includes receiving a request from an end user for a service provided by a REST end point, implementing a data retrieval from the REST end point on behalf of the end user to obtain one or more representations of resources for the requested service, extracting a primary key from the one or more representations of resources, using the primary key to obtain custom data for the requested service, and merging the custom data with the one or more representations of resources to create a response to the request from the end user for the service.

In exemplary embodiments, a non-transitory machine readable storage medium is provided for having instructions stored thereon that when executed by one or more processors cause the one or more processors to perform a method comprising receiving a request from an end user for a service provided by a REST end point, implementing a data retrieval from the REST end point on behalf of the end user to obtain one or more representations of resources for the requested service, extracting a primary key from the one or more representations of resources, using the primary key to obtain custom data for the requested service, merging the custom data with the one or more representations of resources to create a response to the request from the end user for the service, and forwarding the response to the end user.

In exemplary embodiments, a system is provide for comprising one or more processors and non-transitory machine readable storage medium, program instructions to receive a request from an end user for a service provided by a REST end point, program instructions to implement a data retrieval from the REST end point on behalf of the end user to obtain one or more representations of resources for the requested service, program instructions to extract a primary key from the one or more representations of resources, program instructions to use the primary key to obtain custom data for the requested service, program instructions to merge the custom data with the one or more representations of resources to create a response to the request from the end user for the service, and program instructions to forward the response to the end user. The program instructions are stored on the non-transitory machine readable storage medium for execution by the one or more processors.

In exemplary embodiments, a method is performed by a computing system, and the method includes receiving a request for properties that are available for a service, wherein the properties include a base field and a custom field, obtaining an endpoint descriptor for the service from one or more repositories, using the endpoint descriptor to call an end point that provides the service, retrieving the base field from the end point, and retrieving the custom field from one or more additional repositories that are remote from the end point.

In some embodiments, the service is a REST service, and the endpoint is a REST end point configured to provide the REST service. In other embodiments, the request for the properties is received from an end user at a library of the computing system, and the base field includes a value for a parameter or resource used by the service, and the custom field includes a value provided by the end user for the parameter or resource.

In some embodiments, the method further includes receiving a request from the end user to update or remove the custom field, updating or removing the custom field, and notifying the end user that the update or removal of the custom field has been implemented.

In some embodiments, the method further includes receiving a request from the end user to update or delete a value for a parameter or resource in the custom field, updating or deleting the value in the custom field, saving the update or deletion of the value in the one or more repositories, and notifying the end user that the update or deletion of the value has been implemented.

In exemplary embodiments, a non-transitory machine readable storage medium is provided for having instructions stored thereon that when executed by one or more processors cause the one or more processors to perform a method comprising receiving a request for properties that are available for a REST service from an end user, wherein the properties include a base field and a custom field, obtaining an endpoint descriptor for the service from one or more repositories, using the endpoint descriptor to call a REST end point that provides the service, retrieving the base field from the end point, and retrieving the custom field from one or more additional repositories that are remote from the end point. The base field includes a value for a parameter or resource used by the service, and the custom field includes a value provided by the end user for the parameter or resource.

In exemplary embodiments, a system is provide for comprising one or more processors and non-transitory machine readable storage medium, program instructions to receive a request for properties that are available for a REST service from an end user, wherein the properties include a base field and a custom field, program instructions to obtain an endpoint descriptor for the service from one or more repositories, program instructions to use the endpoint descriptor to call a REST end point that provides the service, program instructions to retrieve the base field from the end point, and program instructions to retrieve the custom field from one or more additional repositories that are remote from the end point. The program instructions are stored on the non-transitory machine readable storage medium for execution by the one or more processors. The base field includes a value for a parameter or resource used by the service, and the custom field includes a value provided by the end user for the parameter or resource.

The foregoing, together with other features and embodiments will become more apparent upon referring to the following specification, claims, and accompanying drawings.

DETAILED DESCRIPTION

Figure 1:
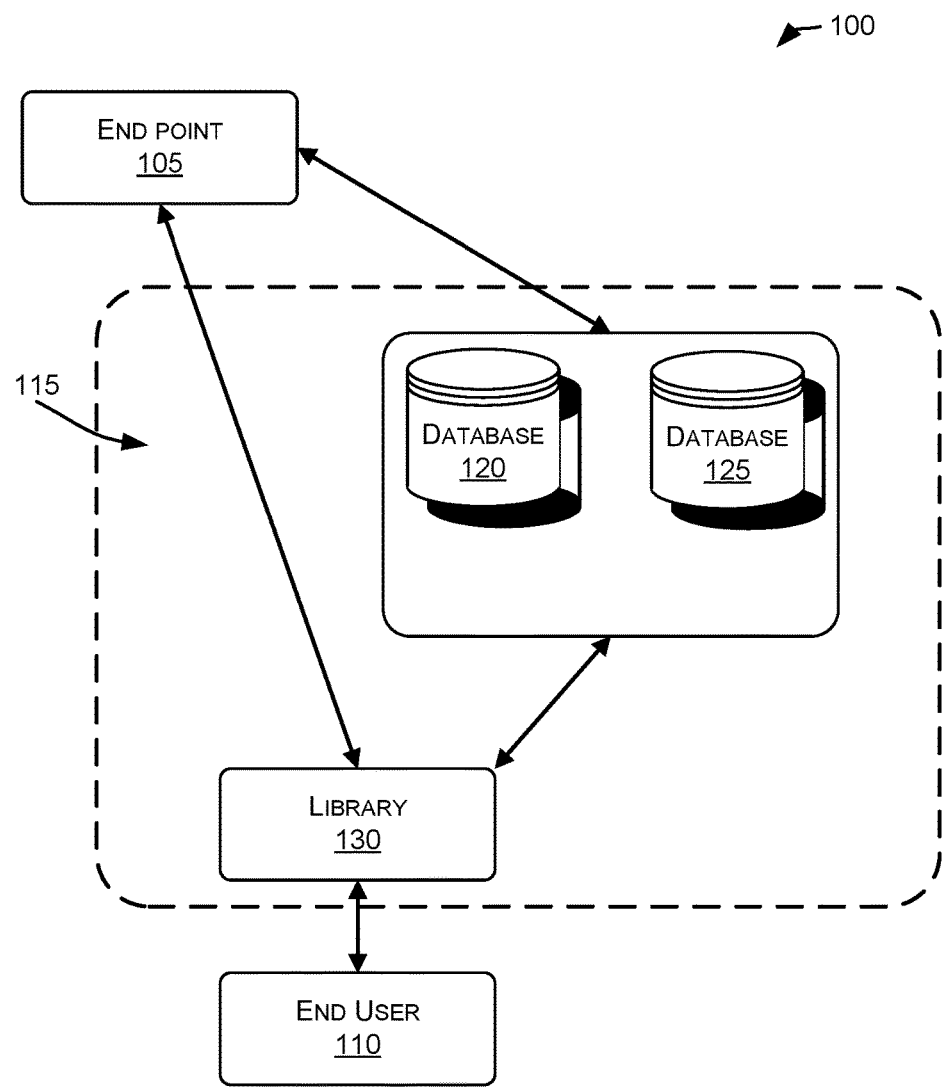
FIG. 1 is a simplified block diagram illustrating components of a system environment that may be used in accordance with some exemplary embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

RESTful web services are built to work on the Web. A RESTful web service exposes a set of resources that identify the targets of the interaction with its clients. In the REST architectural style, data and functionality are considered the resources and are accessed using URIs, typically links on the Web. The resources are acted upon by using a set of simple, well-defined operations. For example, resources may be manipulated using a fixed set of operations including create, read, update, delete operations: POST, GET, PUT or PATCH, and DELETE. POST creates a new resource, which can be then deleted by using DELETE. GET retrieves the current state of a resource in some representation. PUT transfers a new state onto a resource. The resources may be decoupled from their representation so that their content can be accessed in a variety of formats, such as HTML, XML, plain text, PDF, JPEG, JSON, and others. Each interaction with a resource is stateless; that is, request messages are self-contained. Stateful interactions are based on the concept of explicit state transfer. Several techniques exist to exchange state, such as URI rewriting, cookies, and hidden form fields. State can be embedded in response messages to point to valid future states of the interaction To address the needs for enhancing RESTful web services with custom data, in accordance with some exemplary embodiments, described herein is a system and method that inserts custom data into any existing REST data resources as long as the existing REST data resource has an identity. In some embodiments, the customization capability described above is enabled via an enhanced information provider (EIP) that comprises one or more databases to store custom fields, one or more databases to store REST endpoint descriptors, and one or more libraries of routines for end users to interact with the EIP. The EIP can be used for identifying properties (e.g., base fields and custom fields) available for a service provided by a REST endpoint, adding/removing properties (e.g., custom fields) to the service, retrieving the service, updating the service, and deleting the service. This allows for the enhancement of any existing REST data resources that are used to provide the service without access to the original application providing the service, and the end user is completely abstracted from where and how the custom data within the custom fields is stored. Accordingly, any RESTful web services client may use the EIP to support enhancement of the resources provided by the RESTful web service.

Embodiments of the present invention may be used in a variety of different domains and contexts. Certain embodiments are particularly applicable to enterprise application software provided in a REST architecture, which are commonly used to exchange representations of resources to meet the business requirements of specific tenants (e.g., customers). However, the systems and methods described herein may be used to provide custom data functionality for any system or application framework that relies on RESTful web services.

FIG. 1 is a simplified block diagram illustrating components of a system environment 100 that may be used in accordance with an embodiment of the present invention. As shown in FIG. 1, the system environment 100 can include REST endpoint 105, end user 110, and EIP 115. The EIP 115 can include one or more databases 120, one or more additional databases 125, and one or more libraries 130.

As shown in FIG. 1, a service can provide a REST endpoint 105 against which the end user 110 can query, create, update, and delete resources. The REST endpoint 105 may be a URI to a website. For example, an address service may be available to end user 110, which stores a postal address for a user's email. The service may be available at http://address.com/address. The end user 110 can obtain all available resources and other information about the resources at the end point 105 as one or more representations such as a JavaScript Object Notation (JSON) object. The resources may be manipulated using a fixed set of operations including: POST, GET, PUT, and DELETE. For example, the GET action may be used by the end user 110 to retrieve one or more representations of a resource from the end point 105. Continuing with the above example, the end user 110 can use GET http://address.com/address/paul@gmail.com to obtain data email: 'paul@gmail.com', name: 'Paul Goodman', address: '14 School Rd, Wellington'. The addresses may be registered and maintained on the website by a service provider on behalf of their owners.

The end user 110 is a one or more persons or entities who ultimately use or is intended to ultimately use one or more of the resources. Continuing with above example, end user 110 may be Jane who is using the address.com service to mail her clients gift vouchers. Jane may have a list of emails and names of her clients; however, for up to date postal addresses, Jane relies on the address.com service.

The EIP 115 can include one or more repositories such as databases 120 to store custom fields. The databases 120 are remotely located from the end point 105, and in accordance with aspects of the present invention, the EIP 115 and databases 120 may be provided by a different user from that of the user providing the service via end point 105. In some embodiments, the databases 120 may be structure query language (SQL) databases. However, the databases 120 are not limited to SQL and may be structured in other manners such as a file system. The custom fields may contain custom data (e.g., vouchers, birth dates, places of employment, employment addresses, telephone numbers, preferences, etc.) provided by users to be used to enhance the REST service provided by REST end point 105. The custom fields permit a user to input custom values for parameters or resources (e.g., vouchers, birth dates, places of employment, employment addresses, telephone numbers, preferences, etc.) and not simply select from predefined values or predefined parameters. Accordingly, the one or more databases 120 permit customization of RESTful services because values for parameters are not restricted to predefined values, but can instead be defined on-the-fly by the users.

The EIP 115 can also include one or more repositories such as databases 125 to store REST endpoint descriptors. The databases 125 are remotely located from the end point 105, and in accordance with aspects of the present invention, the EIP 115 and databases 125 may be provided by a different user from that of the user providing the service via end point 105. In some embodiments, the databases 125 may be REST endpoint additional information (AI) databases. The REST endpoint descriptors may be constructed using RESTful API modeling language (RAML), swagger descriptors, and/or custom information provided by the owner/operator of the REST service. The REST end point descriptors could be constructed by the owner/operator of the REST service to document the REST endpoint 105 such that its clients/customers (e.g., end user 110) know how to call the REST end point 110 and the type of data to pass onto the REST end point 110 to receive the RESTful service from the REST end point 105. Alternatively, if the owner/operator of the REST end point 105 does not construct a REST end point descriptor or constructs the REST end point descriptor in a reduced manner, then the REST end point descriptor could be constructed by the owner/operator of the EIP 115, provided that the owner/operator of the EIP 115 has the capability and information required to write the REST end point descriptor.

In some embodiments, the basic structure of a REST endpoint descriptor may include one or more of type, identifier, format, action, and the endpoint. The type specifies the data object's type, the identifier specifies the URI for the REST endpoint descriptor, the format specifies the media type supported by the REST service at the specified endpoint, the action specifies the HTTP actions that the REST service supports, e.g., GET, the endpoint specifies a URI template for the service endpoint and tells a client such as the end user 110 or the EIP 115 how to construct a URI that will allow the client to manipulate object representations that conform to the media type specified by the format parameter.

For example a REST endpoint descriptor could be constructed as follows:

```
address.raml:
schemas:
    -addressEntity: |
        {
            "description": "Address",
            "properties": {
                "email": { "description": "Unique email identifying
                    address", "type": "string" },
                "name": { "description": "Person name", "type":
                    "string" },
                "address": { "description": "Person address", "type":
                    "string" }
            },
            "required": [ "email" ]
        }
/address:
    /{email}:
        get:
            description: |
                Retrieves address for the specified email.
            responses:
                200:
                    description: |
                        OK.
                    body:
                        application/json:
                            schema: addressEntity
```

In some embodiments, the EIP 115 can automatically parse the REST endpoint descriptor once the REST end point descriptor has been obtained from the end point 105, and use a heuristic to identify a primary key (PK) for the end point 105. The heuristic compares information from the REST endpoint descriptor to information contained within the URI for the REST end point to derive the primary key. For example, since REST URIs refer to resources in a unique manner, the above address.raml indirectly states that calling GET on URI /address:/{email} will return the address and the primary key is {email}. The fact that the same email field name is defined earlier in "addressEntity" is what the heuristic relies on to identify the primary key. This information may or may not be in the RAML or could be expressed slightly differently in the RAIVIL or different REST descriptors. In other embodiments, if the REST endpoint is not described at all or in a reduced manner, then the EIP 115 could call and fetch data from the end point 105, and identify the primary key based on the retrieved data. For example, if calling/address/david@gmail.com fetches {email: "david@gmail.com, name: 'David'"}, then it is possible for the EIP 115 to determine from this REST call that the email property from the response is the same identification used in the URI, and thus the primary key is {email}. In yet other embodiments, if the REST endpoint is not described at all or in a reduced manner, then the EIP 115 owner/operator could insert this information into EIP 115 in some other way independently of the REST endpoint to make the EIP 115 functional (e.g., ["http://address.com/address" →"email"]).

As should be understood by those of ordinary skill in the art, the REST endpoint descriptor can be exposed to a client such as the end user 110 or EIP 115 in a number of ways. In some embodiments, the REST endpoint descriptor may be embedded within some other object as a way to inform the client about related services. In additional or alternative embodiments, the REST endpoint descriptor may be contained within special resources called server profiles. The client discovers the server's profile based on information received through a RESTful interaction.

The EIP 115 may also include library 130 to allow end user 110 to interact with the EIP 115. The library 130 is a collection of implementations of behavior, written in terms of a language, that has a well-defined interface by which the behavior is invoked. This means that as long as a higher level program (e.g., an application of end user 110) uses the library 130 to make system calls, it does not need to be re-written to implement those system calls over and over again. In addition, the behavior is provided for reuse by multiple independent programs. A program invokes the library-provided behavior via a mechanism of the language. In some embodiments, the library is a JavaScript library of pre-written JavaScript routines for end user 110 to interact with EIP 115. It should be understood by those of ordinary skill in the art that although the library 130 is described in some embodiments as being included within the EIP 115, the library 130 could be located remotely from the EIP 115, e.g., provisioned on a computing device of end user 110.

Figure 2:
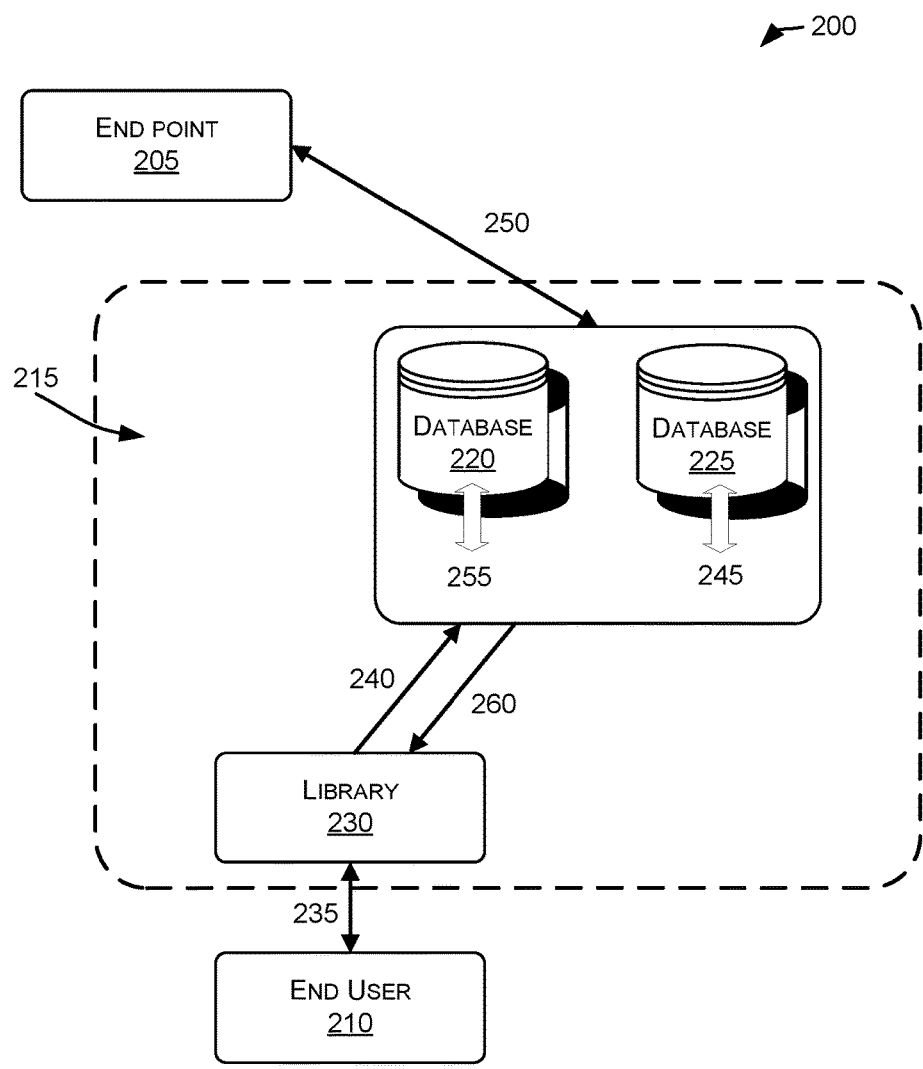
FIG. 2 is a flowchart of a method of determining properties that are available for a service in accordance with some exemplary embodiments.

FIG. 2 is a flowchart 200 illustrating the steps performed in determining properties that are available for a service in accordance with an embodiment of the present invention. In various embodiments, the processing of flowchart 200 may be implemented in software, hardware, or combinations thereof. As software, flowchart 200 may be implemented as part of a REST architecture configured to enhance REST services with custom data.

At step 235, a request is initiated from an end user 210 to the library 230 to obtain properties (e.g., base fields and custom fields) that are available for a service provided by end point 205. In some embodiments, the request can be implemented via the operation: GET. At step 240, the library 230 processes the request and allows the end user 210 to interact with the EIP 215. At step 245, the EIP 215 obtains the REST endpoint descriptor for the service provided by end point 205 from the one or more repositories such as databases 225. Alternatively, in the instance that the REST end point descriptor has not been previously cached in databases 225, the EIP 215 fetches (not shown) the REST end point descriptor from the end point 205 and caches the REST end point descriptor in the databases 225 for present and future use. At step 250, the EIP 215 uses the obtained REST endpoint descriptor to retrieve base fields available for the service provided by end point 205. The call from the EIP 215 to the end point 205 to retrieve the base fields may be initiated as needed.

At step 255, the EIP 215 retrieves custom fields available for the service from the one or more repositories such as databases 220, which are remote from the end point 205. The custom fields are retrieved based on an association with a REST payload. For example, in the above example for GET on URI/address:/{email}, the payload is "addressEntity", and "addressEntity" would be associated with the custom fields for the service. The same payload could also be used to create the custom field (POST or ADD) or update the custom field (UPDATE or PATCH), as discussed in detail herein. Consequently, one set of custom fields could get associated with several end points, which all work with the same "Entity". In some embodiments, the default is that the EIP retrieves all of the custom fields available for the service provided by end point 205; however, the end user 110 can specify in the request initiated at step 235 to obtain only a subset of the custom fields.

At step 260, the EIP 215 forwards the REST endpoint descriptor and/or properties comprising the base fields and the custom fields to the end user 210 via the library 230. In some embodiments, the REST endpoint descriptor and/or properties comprising the base fields and the custom fields are cached in the library 230 until further needed.

Continuing with the example described with respect to FIG. 1, Jane may call the EIP 215 via the library 230 with getFields(http://address.com/address) to obtain properties for the service: address. The EIP 215 may retrieve the REST endpoint descriptor for "address" from the databases 225. The EIP 215 may then use the REST endpoint descriptor for "address" to retrieve the base fields available for "address" provided by end point 205, and retrieve the custom fields available for "address" from the one or more databases 220. The EIP 215 may return the following: {baseFields: ['email', 'name', 'address'], customFields: ['vouchersSent', 'birthday']} to Jane. The base fields ['email', 'name', 'address'] are retrieved from the end point 205, and the custom fields are retrieved from the one or more databases 220 that were previously created by Jane (this example assumes that Jane already added 'vouchersSent', 'birthday' as custom fields for address to the EIP 215, as described below with respect to FIG. 3).

Figure 3:
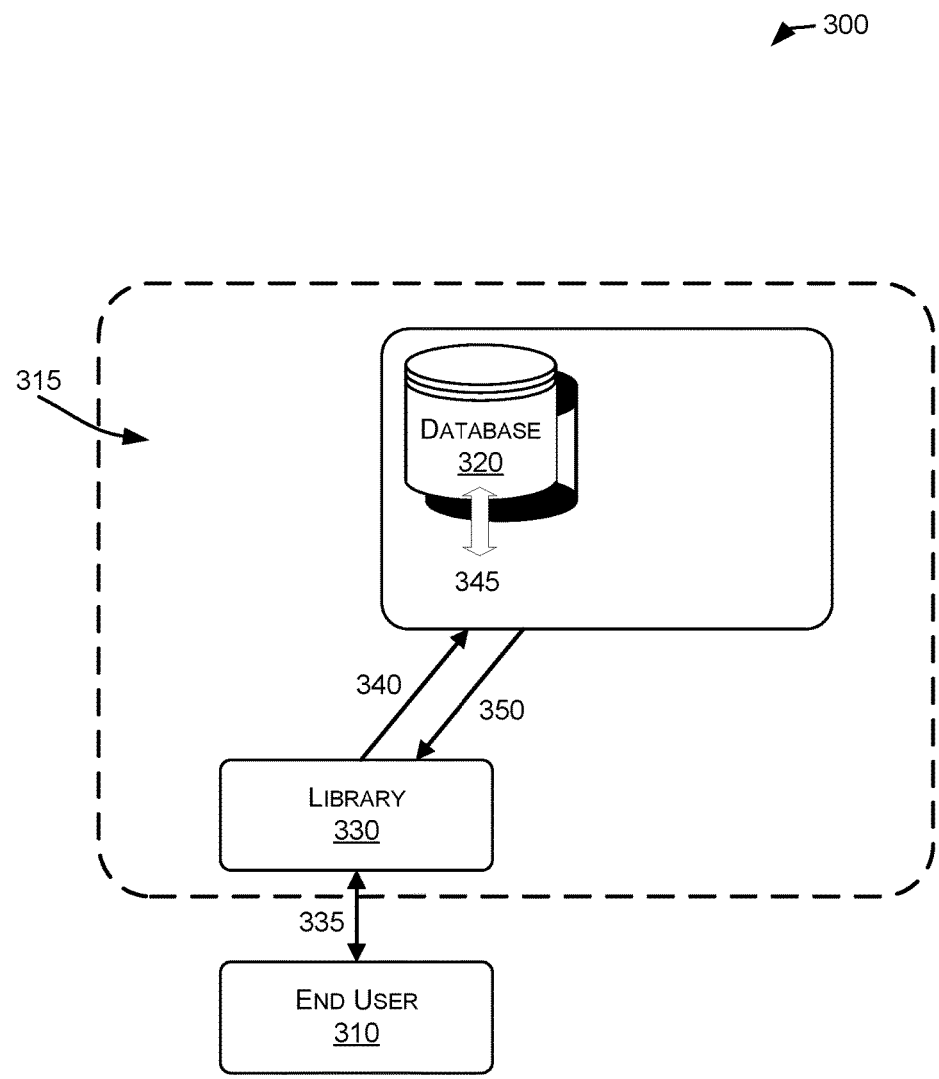
FIG. 3 is a flowchart of a method of adding or removing custom properties for a service in accordance with some exemplary embodiments.

FIG. 3 is a flowchart 300 illustrating the steps performed in adding or removing custom properties for a service in accordance with an embodiment of the present invention. In various embodiments, the processing of flowchart 300 may be implemented in software, hardware, or combinations thereof. As software, flowchart 300 may be implemented as part of a REST architecture configured to enhance REST services with custom data.

At step 335, a request is initiated from an end user 310 to the library 330 to create or remove one or more custom properties (e.g., custom fields) for a service provided by an end point (not shown). In some embodiments, the request can be implemented via the operation: POST, ADD or REMOVE. At step 340, the library 330 processes the request and allows the end user 310 to interact with the EIP 315. At step 345, the EIP 315 creates or removes the one or more custom properties (e.g., custom fields) from the one or more databases 320. The creation of the one or more custom properties to the one or more databases 320 includes associating a REST payload with custom properties such that the custom properties can be later retrieved upon receipt of a request for the service provided by the end point. At step 350, the EIP 315 notifies the end user 310 via the library 330 that the addition or removal of the one or more custom properties has been implemented.

Continuing with the example described with respect to FIG. 2, Jane may call the EIP 315 via the library 330 with addFields("http://address.com/address", 'thirdCustomField', 'nthCustomField') to create custom properties or fields for the service: address. Alternatively, Jane may call the EIP 315 via the library 330 with removeFields("http://address.com/address", 'testOnlyCustomField' to remove a custom property or field for the service: address. The EIP 315 may return a notification to Jane via the library 330 that the creation or removal of the one or more custom properties has been implemented.

Figure 4:
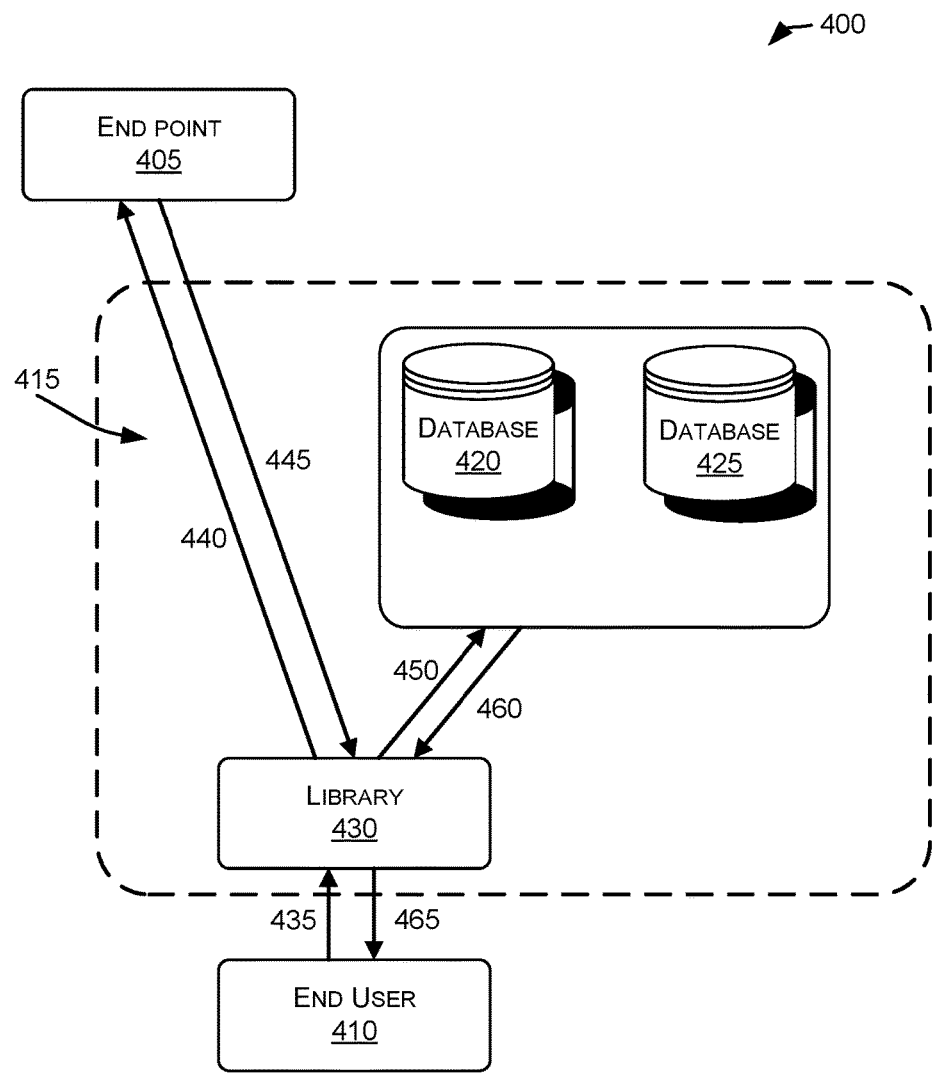
FIG. 4 is a flowchart of a method of retrieving a service from a REST end point in accordance with some exemplary embodiments.

FIG. 4 is a flowchart 400 illustrating the steps performed in retrieving a service from a REST end point in accordance with an embodiment of the present invention. In various embodiments, the processing of flowchart 400 may be implemented in software, hardware, or combinations thereof. As software, flowchart 400 may be implemented as part of a REST architecture configured to enhance REST services with custom data.

At step 435, a request is initiated from an end user 410 to the library 430 to request a service provided by end point 405. In some embodiments, the request can be implemented via the operation: READ, and specifies which custom fields are to be retrieved, if not all. At step 440, the library 430 processes the request and implements a data retrieval from end point 405 on behalf of the end user 410 to obtain the one or more representations of resources for the requested service. At step 445, the end point 405 sends the one or more representations of resources (DATA) for the requested service to the library 430.

At step 450, the library 430 extracts one or more primary keys (PK) from the one or more representations of resources (DATA), and the library 430 requests custom field values or custom data for the PK from the one or more databases 420 of the EIP 415. In some embodiments, the PK may be extracted from the one or more representations of resources (DATA) based on the REST endpoint descriptor and/or properties comprising the base fields previously cached or loaded in the library 430, as described with respect to FIGS. 1 and 2. For example, the PK name and value of the PK could be in the one or more representations of resources (DATA) returned in step 445, and/or the PK name and value of the PK can be in the URI. This information allows the library 430 to extract the PK as described with respect to FIG. 1, and request custom field values or custom data for the PK from the one or more databases 420 of the EIP 415.

At step 460, the EIP 415 retrieves custom field values or custom data for the PK from the one or more databases 420, and forwards the custom field values or custom data for the PK to the library 430. At step 465, the library 430 merges the one or more representations of resources (DATA) with the custom field values or custom data to create one or more custom representations of resources (DATA2), and returns the one or more custom representations of resources (DATA2) to the end user 410 in response to the request for a service provided by end point 405. This allows for the enhancement of any existing REST data resources used to provide the service without access to the original application providing the service, and the end user is completely abstracted from where and how the custom data within the custom fields is stored. Accordingly, any RESTful web services client may use the EIP to support enhancement of the resources provided by the RESTful web service.

Continuing with the example described with respect to FIG. 3, Jane may call the end point 404 via the library 430 with read("http://address.com/address/paul@gmail.com", requestData, fieldToReturn) to obtain the one or more representations of resources (DATA) for the service: address. The fieldToReturn can be ['email, 'name', 'address', 'voucherSend', 'birthday'] or null or pre-selected fields. The library 430 may extract the PK from the obtained one or more representations of email, name, and address resources (DATA). For example, the primary key name in this example is 'email' and the value of the primary key could be either in the returned data from step 445 (DATA.email) or it can be in the URI itself—http://address.com/address/paul@gmail.com (because RAML said/address/{email}). This information allows the library 430 to extract PK: paul@gmail.com, and request the voucher and birthday resources for paul@gmail.com from the one or more databases 420 of the EIP 415. The library 430 may merge the obtained one or more representations of email, name, and address resources (DATA) and the voucher and birthday resources, and return DATA2={email: 'paul@gmail.com', name: 'Paul Goodman', address: '14 School Rd, Wellington', vouchersSent: ['amazon'], 'birthday': '1.2.1991'} to Jane.

Figure 5:
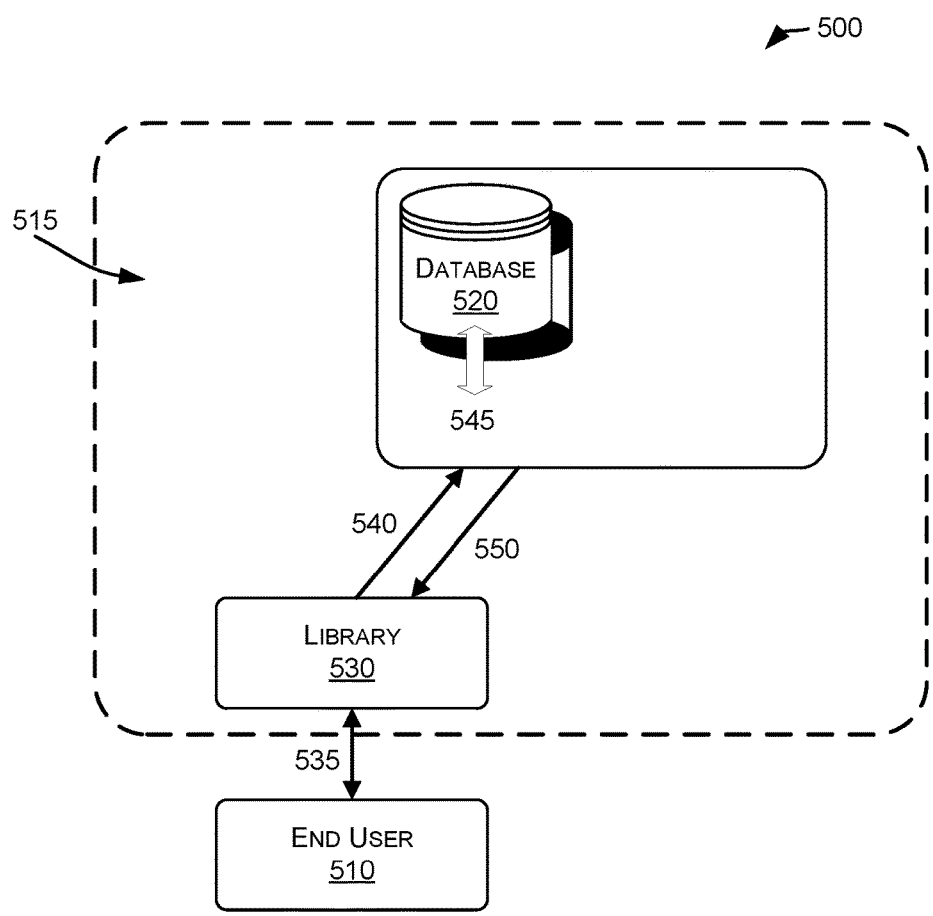
FIG. 5 is a flowchart of a method of updating custom field values or custom data for a service in accordance with some exemplary embodiments.

FIG. 5 is a flowchart 500 illustrating the steps performed in updating custom field values or custom data for a service in accordance with an embodiment of the present invention. In various embodiments, the processing of flowchart 500 may be implemented in software, hardware, or combinations thereof. As software, flowchart 500 may be implemented as part of a REST architecture configured to enhance REST services with custom data.

At step 535, a request is initiated from an end user 510 to the library 530 to update custom field values or custom data for a service provided by an end point (not shown). In some embodiments, the request can be implemented via the operation: UPDATE or PATCH, and includes the custom field values or custom data to be stored. At step 540, the library 530 processes the request and allows the end user 510 to interact with the EIP 515. At step 545, the EIP 515 updates the custom field values or custom data in the one or more databases 520, and saves the changes in the one or more databases 520. At step 550, the EIP 515 notifies the end user 510 via the library 530 that the update of the custom field values or custom data has been implemented.

Continuing with the example described with respect to FIG. 4, Jane may call the EIP 515 via the library 530 with update ("http://address.com/address/paul@gmail.com", requestData, {vouchersSent: ['amazon', 'hobbycentral']}) to add custom data including amazon and hobbycentral vouchers to the custom vouchersSent field in the one or more databases 520 for the service: address. The EIP 515 may return a notification to Jane via the library 530 that the update of the custom field values or custom data has been implemented.

Although flowchart 500 and the above example are specific to updating custom field values or custom data, it should be understood that in an instance in which a user has permission to update base field values or base data, a similar process could be utilized to affect such changes in the base field values or base data. For example, the request can be implemented via the operation: UPDATE, and may additionally or alternatively include the base field values or base data to be stored (e.g., url, requestData, {address: 'new postal address', vouchersSent: 'some value'}). Consequently, at step 540 when the library 530 processes the request, the library may call the REST endpoint (not shown)

and the EIP 515 in parallel or sequentially to have the update changes implemented per the request.

Figure 6:
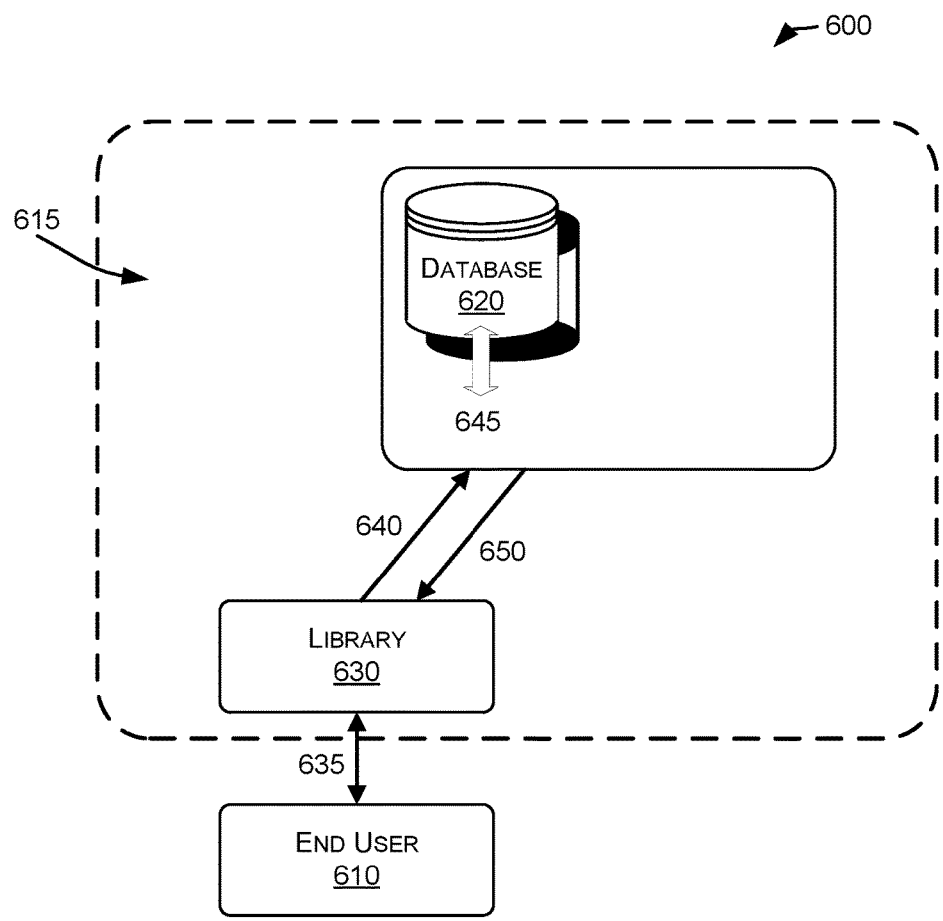
FIG. 6 is a flowchart of a method of deleting custom field values or custom data for a service in accordance with some exemplary embodiments.

FIG. 6 is a flowchart 600 illustrating the steps performed in deleting custom field values or custom data for a service in accordance with an embodiment of the present invention. In various embodiments, the processing of flowchart 600 may be implemented in software, hardware, or combinations thereof. As software, flowchart 600 may be implemented as part of a REST architecture configured to enhance REST services with custom data.

At step 635, a request is initiated from an end user 610 to the library 630 to delete custom field values or custom data for a service provided by end point 605. In some embodiments, the request can be implemented via the operation: DELETE, and includes the custom field values or custom data to be deleted. At step 640, the library 630 processes the request and allows the end user 610 to interact with the EIP 615. At step 645, the EIP 615 deletes the custom field values or custom data in the one or more databases 620, and saves the changes in the one or more databases 620. At step 650, the EIP 615 notifies the end user 610 via the library 630 that the deletion of the custom field values or custom data has been implemented.

Continuing with the example described with respect to FIG. 5, Jane may call the EIP 615 via the library 630 with delete ("http://address.com/address/paul@gmail.com", requestData) to delete all custom data associated with paul@gmail.com from the one or more databases 620 for the service: address. The EIP 615 may return a notification to Jane via the library 630 that the update of the custom field values or custom data has been implemented. Alternatively, Jane may call the EIP 615 via the library 630 with delete ("http://address.com/address/paul@ gmail.com", requestData, ['vouchersSent'] to delete custom vouchersSent field in the one or more databases 620 for the service: address. This is similar to 'fieldToReturn' described with respect to FIG. 4 but in this instance the variable would be named 'fieldsToDelete' and the value may be ['voucherSent' . . . 'andSoOn'].

Although flowchart 600 and the above example are specific to deleting custom field values or custom data, it should be understood that in an instance in which a user has permission to delete base field values or base data, a similar process could be utilized to affect such changes in the base field values or base data. For example, the request can be implemented via the operation: DELETE, and may additionally or alternatively include the base field values or base data to be deleted (e.g., url, requestData, {address: 'new postal address', vouchersSent: 'some value'}). Consequently, at step 640 when the library 630 processes the request, the library may call the REST endpoint (not shown) and the EIP 615 in parallel or sequentially to have the deletion changes implemented per the request.

The exemplary embodiments herein have been described with respect to a single end user and a single REST endpoint, however, more than a single end user and/or a single REST endpoint can be included in the REST architecture. Further, the end user can access more than one service from the one or more REST endpoints, which may be serviced by the EIP in accordance with aspects of the present invention to enhance the service(s) with custom data.

Figure 7:
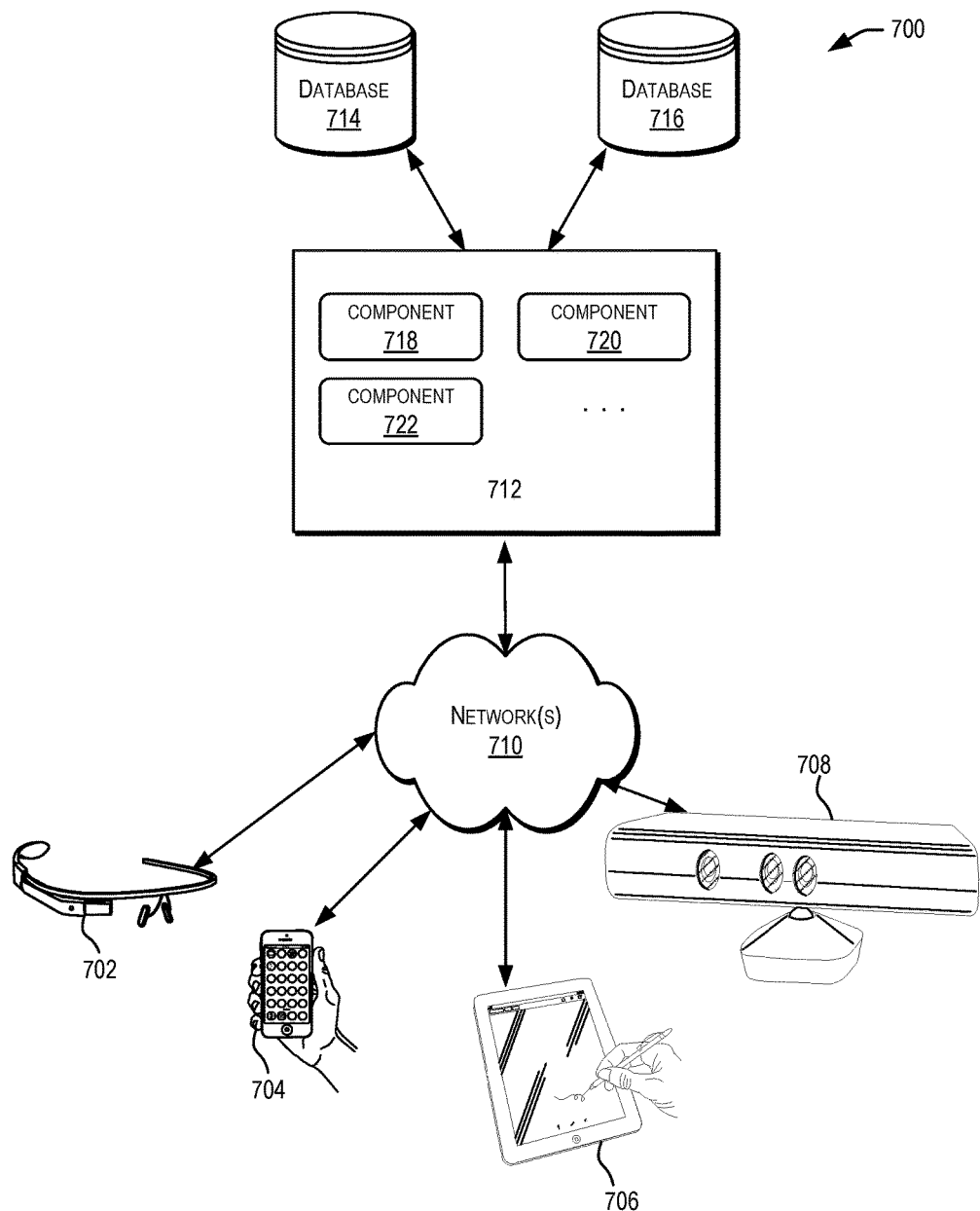
FIG. 7 illustrates a simplified diagram of a distributed system for implementing some exemplary embodiments.

FIG. 7 illustrates a simplified diagram of a distributed system 700 for implementing an exemplary embodiment. In the illustrated exemplary embodiment, the distributed system 700 includes one or more client computing devices 702, 704, 706, and 708, which are configured to execute and operate a client application such as a web browser, proprietary client, or the like over one or more network(s) 710. The server 712 may be communicatively coupled with the remote client computing devices 702, 704, 706, and 708 via network 710.

In various embodiments, the server 712 (e.g., an enhanced information provider) may be adapted to run one or more services or software applications such as services and applications that provide customized RESTful services. In certain embodiments, the server 712 may also provide other services or software applications can include non-virtual and virtual environments. In some embodiments, these services may be offered as web-based or cloud services or under a Software as a Service (SaaS) model to the users of the client computing devices 702, 704, 706, and/or 708. Users operating the client computing devices 702, 704, 706, and/or 708 may in turn utilize one or more client applications to interact with the server 712 to utilize the services provided by these components.

In the configuration depicted in FIG. 7, the software components 718, 720 and 722 of system 700 are shown as being implemented on the server 712. In other embodiments, one or more of the components of the system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 7 is thus one example of a distributed system for implementing an embodiment system and is not intended to be limiting.

The client computing devices 702, 704, 706, and/or 708 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 710.

Although distributed system 700 in FIG. 7 is shown with four client computing devices, any number of client computing devices may be supported. Other devices, such as devices with sensors, etc., may interact with the server 712.

The network(s) 710 in the distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 712 can include one or more virtual machines running virtual operating systems, or other computing architectures involving virtualization. One or more flexible pools of logical storage devices can be virtualized to maintain virtual storage devices for the server. Virtual networks can be controlled by the server 712 using software defined networking. In various embodiments, the server 712 may be adapted to run one or more services or software applications described in the foregoing disclosure. For example, the server 712 may correspond to a server for performing processing as described above according to an embodiment of the present disclosure.

The server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 712 may include one or more applications to analyze and consolidate data feeds and/or event updates received from users of the client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 712 may also include one or more applications to display the data feeds and/or real-time events via one or more display devices of the client computing devices 702, 704, 706, and 708.

The distributed system 700 may also include one or more databases 714 and 716. These databases may provide a mechanism for storing information such as custom data for a RESTful service, and other information used by embodiments of the present invention. Databases 714 and 716 may reside in a variety of locations. By way of example, one or more of databases 714 and 716 may reside on a non-transitory storage medium local to (and/or resident in) the server 712. Alternatively, the databases 714 and 716 may be remote from the server 712 and in communication with the server 712 via a network-based or dedicated connection. In one set of embodiments, the databases 714 and 716 may reside in a storage-area network (SAN). Similarly, any necessary files for performing the functions attributed to the server 712 may be stored locally on the server 712 and/or remotely, as appropriate. In one set of embodiments, the databases 714 and 716 may include relational databases, such as databases provided by Oracle, that are adapted to store, update, and retrieve data in response to SQL-formatted commands.

Figure 8:
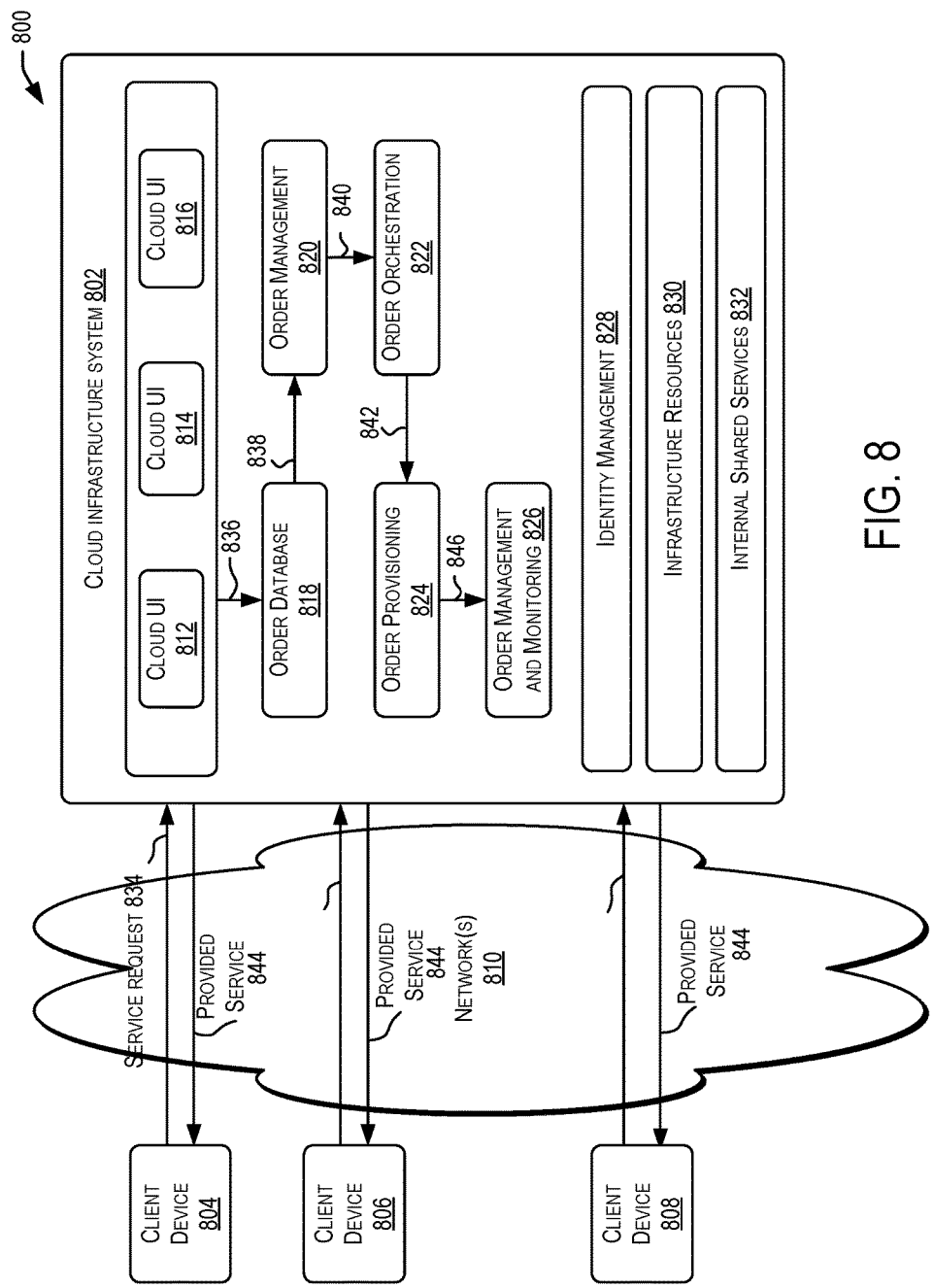
FIG. 8 illustrates a simplified block diagram of one or more elements of a system environment in which services may be offered as cloud services in accordance with some exemplary embodiments.

In some embodiments, the RESTful services described above may be offered as services via a cloud environment. FIG. 8 illustrates a simplified block diagram of one or more components of a system environment 800 in which services may be offered as cloud services, in accordance with an embodiment of the present disclosure. In the illustrated embodiment in FIG. 8, system environment 800 includes one or more client computing devices 804, 806, and 808 that may be used by users to interact with a cloud infrastructure system 802 that provides cloud services, including services enhancing RESTful services with custom data. Cloud infrastructure system 802 may comprise one or more computers and/or servers.

It should be appreciated that cloud infrastructure system 802 depicted in FIG. 8 may have other components than those depicted. Further, the embodiment shown in FIG. 8 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

In certain embodiments, services provided by cloud infrastructure system 802 may include a host of services that are made available to users of the cloud infrastructure system on demand. In addition to services related to enhancing RESTful services with custom data, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provision of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in FIG. 8, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs.

The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 8, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 824 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
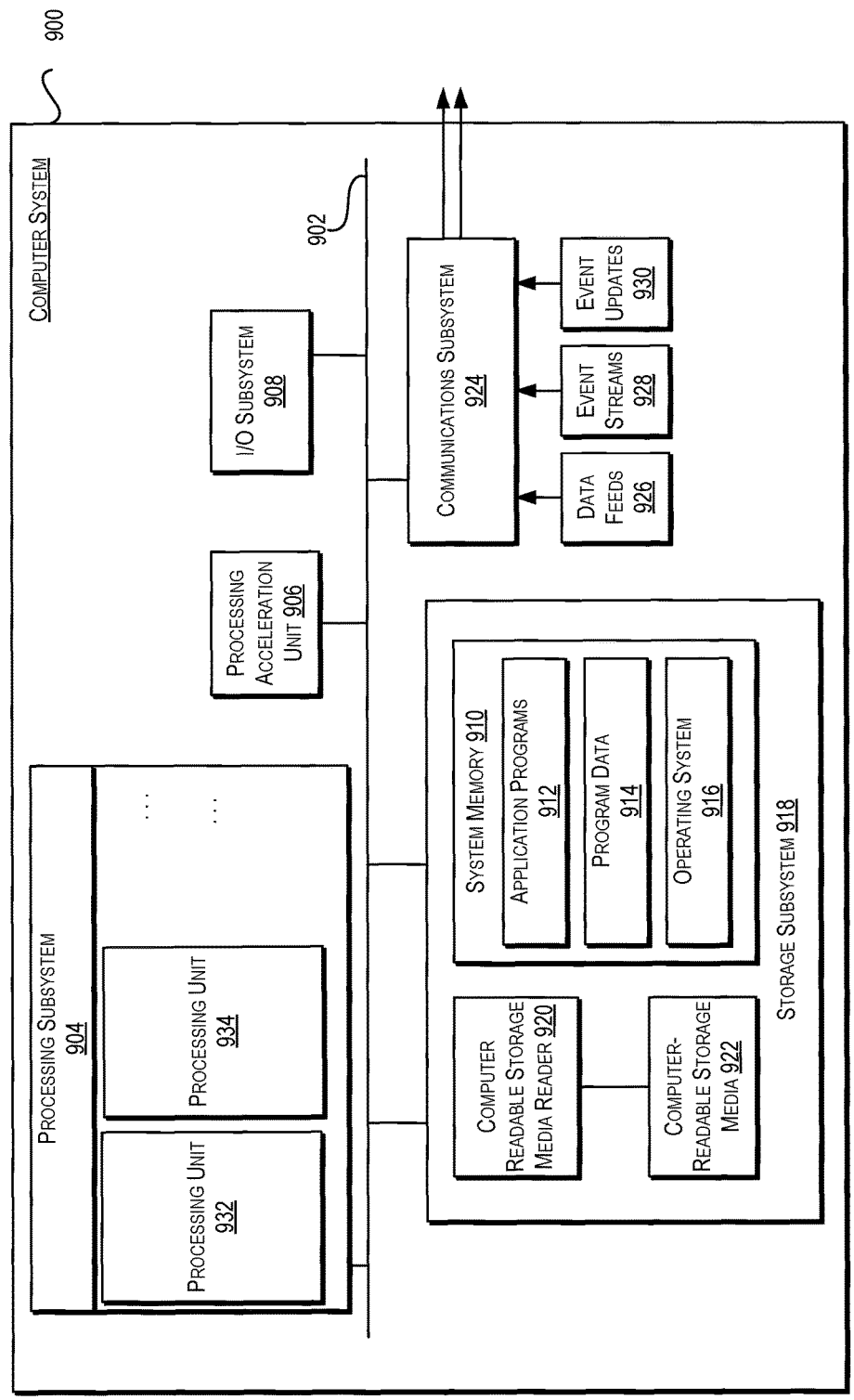
FIG. 9 illustrates an exemplary computer system that may be used to implement certain elements according to some exemplary embodiments.

FIG. 9 illustrates an exemplary computer system 900 that may be used to implement an embodiment of the present invention. In some embodiments, computer system 900 may be used to implement any of the various servers and computer systems described above. As shown in FIG. 9, computer system 900 includes various subsystems including a processing subsystem 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 910 including potentially on one or more storage devices. Through suitable programming, processing subsystem 904 can provide various functionalities described above for enhancing RESTful services with custom data.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 9, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 918 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
receiving, by an enhanced information provider (EIP), a request for properties that are available for a REpresentational State Transfer (REST) service, wherein the properties include: (i) a base field that includes a value for a parameter or resource used by the REST service, and (ii) a custom field that includes a value provided by an end user for the parameter or resource, wherein the EIP comprises one or more databases to store custom fields, one or more databases to store REST endpoint descriptors, and one or more libraries of routines for end users to interact with the EIP, and wherein the request is received at the one or more libraries;
obtaining, by the EIP, a REST endpoint descriptor for the REST service from the one or more databases that store the REST endpoint descriptors;
using, by the EIP, the REST endpoint descriptor to call a REST end point that provides the REST service;
retrieving, by the EIP, the base field from the REST end point;
retrieving, by the EIP, the custom field from the one or more databases that store the custom fields, which are remote from the REST end point; and
forwarding, by the EIP, the base field and the custom field to the end user.

2. The method of claim 1, further comprising:
receiving, by the EIP, a request from the end user to add or remove the custom field;
adding or removing, by the EIP, the custom field; and
notifying, by the EIP, the end user that the addition or removal of the custom field has been implemented.

3. The method of claim 1, further comprising:
receiving, by the EIP, a request from the end user to update or delete a value for a parameter or resource in the custom field;
updating or deleting, by the EIP, the value in the custom field;
saving the update or deletion of the value, by the computing system, in the one or more repositories; and
notifying, by the EIP, the end user that the update or deletion of the value has been implemented.

4. A non-transitory machine readable storage medium having instructions stored thereon that when executed by one or more processors cause the one or more processors to perform a method comprising:
receiving, by an enhanced information provider (EIP), a request for properties that are available for a REpresentational State Transfer (REST) service from an end user, wherein the properties include a base field and a custom field, wherein the EIP comprises one or more databases to store custom fields, one or more databases to store REST endpoint descriptors, and one or more libraries of routines for end users to interact with the EIP, and wherein the request is received at the one or more libraries;
obtaining, by the EIP, a REST endpoint descriptor for the service from the one or more databases that store the REST endpoint descriptors;
using, by the EIP, the REST endpoint descriptor to call a REST end point that provides the REST service;
retrieving, by the EIP, the base field from the REST end point;
retrieving, by the EIP, the custom field from the one or more databases that store the custom fields, which are remote from the REST end point, wherein the custom fields are retrieved based on an association with a REST payload in the request for properties; and
forwarding, by the EIP, the base field and the custom field to the end user,
wherein the base field includes a value for a parameter or resource used by the REST service, and the custom field includes a value provided by the end user for the parameter or resource.

5. The non-transitory machine readable storage medium of claim 4, wherein the method further comprises:
receiving, by the EIP, a request from the end user for the service provided by the REST end point;

implementing, by the EIP, a data retrieval from the REST end point on behalf of the end user to obtain one or more representations of resources for the requested service;

extracting, by the EIP, a primary key from the one or more representations of resources;

using, by the EIP, the primary key to obtain the value provided by the end user for the parameter or resource; and merging, by the EIP, the value with the one or more representations of resources to create a response to the request from the end user for the service.

6. The non-transitory machine readable storage medium of claim 5, wherein the extracting the primary key comprises parsing the REST endpoint descriptor constructed for the REST end point and using a heuristic to identify the primary key.

7. The method of claim 6, wherein the heuristic compares information from the REST endpoint descriptor to information contained within a uniform resource identifier (URI) for the REST end point to derive the primary key.

8. A system comprising:
an enhanced information provider (EIP) that comprises one or more processors, one or more databases to store custom fields, one or more databases to store REST endpoint descriptors, and one or more libraries of routines for end users to interact with the EIP; and
non-transitory machine readable storage medium storing a set of instructions which when executed by the one or more processors configure the one or more processors to:
receive, at the one or more libraries, a request for properties that are available for a REpresentational State Transfer (REST) service from an end user, wherein the properties include a base field and a custom field;
obtain, by the EIP, a REST endpoint descriptor for the REST service from the one or more databases that store the REST endpoint descriptors;
use, by the EIP, the REST endpoint descriptor to call a REST end point that provides the REST service;
retrieve, by the EIP, the base field from the REST end point;
retrieve, by the EIP, the custom field from the one or more databases that store the custom fields, which are remote from the REST end point; and
forwarding, by the EIP, the base field and the custom field to the end user, wherein the base field includes a value for a parameter or resource used by the REST service, and the custom field includes a value provided by the end user for the parameter or resource.

9. The system of claim 8, wherein the one or more processors are further configured to:
receive, at the one or more libraries, a request from the end user to add or remove the custom field;
add or remove, by the EIP, the custom field; and
notify, by the EIP, the end user that the addition or removal of the custom field has been implemented.

10. The system of claim 8, wherein the one or more processors are further configured to:
receive, at the one or more libraries, a request from the end user to update or delete a value for a parameter or resource in the custom field;
update or delete, by the EIP, the value in the custom field;
save, by the EIP, the update or deletion of the value in the one or more repositories; and
notify, by the EIP, the end user that the update or deletion of the value has been implemented.

11. The system of claim 8, wherein the one or more processors are further configured to:
receive, at the one or more libraries, a request from the end user for the service provided by the REST end point;
implement, by the EIP, a data retrieval from the REST end point on behalf of the end user to obtain one or more representations of resources for the requested service;
extract, by the EIP, a primary key from the one or more representations of resources;
use, by the EIP, the primary key to obtain the value provided by the end user for the parameter or resource;
merge, by the EIP, the value with the one or more representations of resources to create a response to the request from the end user for the service; and
forward, by the EIP, the response to the end user.

12. The system of claim 11, wherein:
the extracting the primary key comprises parsing a REST endpoint descriptor constructed for the REST end point and using a heuristic to identify the primary key; and
the heuristic compares information from the REST endpoint descriptor to information contained within a uniform resource identifier (URI) for the REST end point to derive the primary key.

* * * * *

UNITED STATES PATENT AND TRADEMARK OFFICE
CERTIFICATE OF CORRECTION

PATENT NO. : 10,110,447 B2  
APPLICATION NO. : 15/154146  
DATED : October 23, 2018  
INVENTOR(S) : Konecny Page 1 of 1

It is certified that error appears in the above-identified patent and that said Letters Patent is hereby corrected as shown below:

In the Specification

In Column 4, Line 34, delete "interaction" and insert -- interaction. --, therefor.

In the Claims

In Column 25, Line 18, in Claim 7, delete "method" and insert -- non-transitory machine readable storage medium --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*